Feb. 23, 1954  R. E. YOUNG  2,670,313
METHOD OF MAKING A RING OF A LENGTH
OF THERMOPLASTIC MATERIAL
Filed Jan. 19, 1951
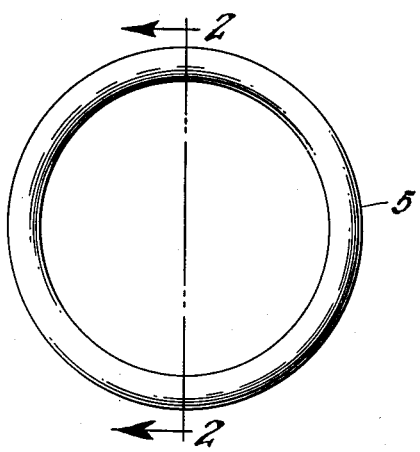
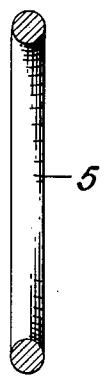
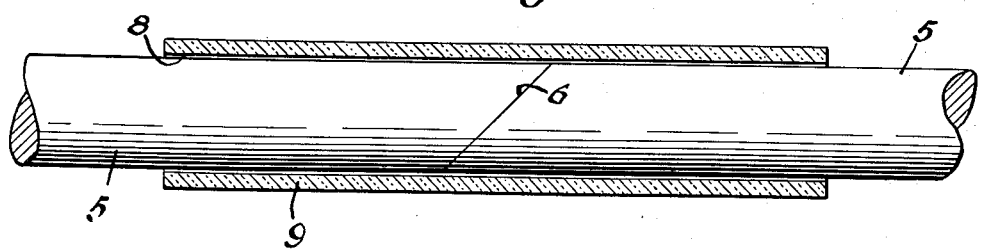
INVENTOR.
Richard E. Young
BY
Popp and Sommer
ATTORNEYS.

Patented Feb. 23, 1954

2,670,313

UNITED STATES PATENT OFFICE 2,670,313

METHOD OF MAKING A RING OF A LENGTH OF THERMOPLASTIC MATERIAL

Richard E. Young, Rockville Centre, N. Y.

Application January 19, 1951, Serial No. 206,793

2 Claims. (Cl. 154—116)

This invention relates to a method of making a ring of a length of thermoplastic material and more particularly to such rings as are used for sealing joints against leakage and where it is important to have the ring of uniform cross sectional size throughout. Particularly in handling corrosive substances, rings, which are round in cross section, and made of a yielding thermoplastic material of a composition, such as fluothene, to resist the corrosive action of such materials are required. It is important in such applications that the ring be of uniform cross sectional size throughout and also of homogeneous composition and free from air bubbles. It is also desirable that the ring be free from any visible weld.

It is one of the principal objects of the present invention to provide a simple and inexpensive process for making such rings in which the ring is made from a rod of thermoplastic material of the desired cross sectional shape and which is of homogeneous composition and free from bubbles or a visible weld.

Another object is to provide such a process in which the finished product is of uniform cross sectional shape.

Another purpose is to provide such a process which results in a ring of uniform strength throughout its diameter and which can be made of a material having a relatively high fusion temperature.

Other objects and advantages of the invention will be apparent from the following description in which:

Fig. 1 is a side elevational view of a ring made from a rod of thermoplastic material in accordance with the present invention.

Fig. 2 is a cross section taken on line 2—2, Fig. 1.

Fig. 3 is an enlarged vertical longitudinal section through the die used in carrying out the process and showing the ends of a length of thermoplastic material inserted therein preparatory to being fused together.

In the practice of the invention, a rod 5 of thermoplastic material, such as fluothene, is cut to conform to the desired length of the ring. This can be either effected by direct transverse cuts, or, as shown, the ends can be cut to provide a scarf joint 6. The ends of the cut rod, as best shown in Fig. 3, are then inserted into the bore 8 of a die 9, this bore 8 being of very slightly larger diameter than the diameter of the rod 5. This die 9 is preferably in the form of a tube of transparent material so that the welding of the scarf joint 6 can be directly observed by the welder thereby to insure a joint which is free from bubbles or any other visible weld mark. The tube or die 9 is also preferably made of a frangible material so that after the welding is completed the die can be removed from the ring by breaking the die. Preferably the tube or die 9 is made of transparent glass. However a separable or two-part die could also be employed.

After the opposite ends of the rod 5 to be formed and the ring have been inserted in the opposite ends of the die 9, the ends are pressed together endwise and this pressure is maintained while heat is locally applied to the exterior of the tube or die 9 to fuse and weld the material at the joint 6. By this means pressure fusion of the mating ends of the length 5 of thermoplastic material is maintained and there is no tendency for the formation of air bubbles or other defects along the line of fusion. In applying such pressure, a temperature gradient is maintained between the middle and between the fused abutting ends and ends of the tube or die 9 and the colder portions of the ends of the rod 5 of thermoplastic material so that the unmelted solid portions of both of said rod ends within the bore of the tube or die 9 act as pistons for confining the molten material to the area immediately surrounding the scarf joint 6.

After the weldment has been fused and carefully observed during fusion through the wall of the glass tube, the die tube 9 is permitted to cool thereby to solidify the thermoplastic material at the joint 6. Thereafter the glass tube 9 is smashed or broken to remove it from the ring.

From the foregoing it will be seen that by having the bore of the die tube 9 very slightly oversize a ring of uniform cross sectional shape results, the shrinkage of the fused material at the weld compensating for the slightly increased diameter of the bore 8.

It will further be seen that since the entire welding operation is directly visible, any welding defects can be observed and cured during the welding process.

It will further be seen that there is nothing critical and that excessive care is not required in carrying out the process since the fused material is completely confined while molten and under pressure of the unfused ends of the rod of material which act as pistons.

I claim:

1. The method of making a ring of substantially uniform cross sectional shape and area throughout its circumference from a solid rod of thermoplastic material, which comprises cutting said rod to conform to the desired diameter of said ring, inserting the opposite ends of said rod into the opposite ends of an open-ended substantially straight die bore slightly larger in cross sectional area and conforming to the cross sectional shape of said rod, bringing said ends into abutting relation with each other, locally heating said abutting ends of said rod to a fusing temperature at said abutting ends and to provide a temperature gradient providing unmelted solid portions of both of said rod ends within said bore, simultaneously with said local heating applying pressure endwise through said unmelted solid portions against the fusing abutting ends to effect pressure fusion of said abutting ends and to expand the fused material at said abutting ends to the full diameter of said bore, permitting said fused mating ends to cool and to shrink to the cross sectional area of the unmelted portions of said rod, and removing the ring from said bore.

2. The method set forth in claim 1 wherein said die bore is provided by an open-ended frangible transparent glass tube and wherein the heat is applied and the conditions of fusion observed through the walls of a central part of said transparent glass tube, and wherein said ring is removed from said bore by breaking said tube.

RICHARD E. YOUNG.

References Cited in the file of this patent

UNITED STATES PATENTS

| Number | Name | Date |
| --- | --- | --- |
| 329,273 | Chickering | Oct. 27, 1885 |
| 1,520,191 | Mackey | Dec. 23, 1924 |
| 1,576,024 | Barrantes | Mar. 9, 1926 |
| 2,217,734 | Dreyfus | Oct. 15, 1940 |
| 2,280,074 | Halsall | Apr. 21, 1942 |
| 2,475,194 | Nyquist | July 5, 1949 |